(12) United States Patent
Hwang et al.

(10) Patent No.: US 12,482,681 B2
(45) Date of Patent: Nov. 25, 2025

(54) SEMICONDUCTOR INSPECTION METHOD INCLUDING HEATING A TOP SURFACE OF A SEMICONDUCTOR PACKAGE

(71) Applicant: Samsung Electronics Co., Ltd., Suwon-si (KR)

(72) Inventors: Soonkyu Hwang, Asan-si (KR); Jinyeol Yang, Cheonan-si (KR); Haegu Lee, Anyang-si (KR); Jae-Min Jeon, Asan-si (KR); Jin Hee Han, Asan-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 492 days.

(21) Appl. No.: 17/890,648

(22) Filed: Aug. 18, 2022

(65) Prior Publication Data

US 2023/0197485 A1    Jun. 22, 2023

(30) Foreign Application Priority Data

Dec. 17, 2021    (KR) .................. 10-2021-0182151

(51) Int. Cl.
*H01L 21/67*    (2006.01)
*G06T 7/00*    (2017.01)

(52) U.S. Cl.
CPC ...... *H01L 21/67288* (2013.01); *G06T 7/0004* (2013.01); *G06T 2207/10048* (2013.01); *G06T 2207/30148* (2013.01)

(58) Field of Classification Search
CPC ............. H01L 21/67288; G06T 7/0004; G06T 2207/10048; G06T 2207/30148;
(Continued)

(56) References Cited

U.S. PATENT DOCUMENTS 6,563,308 B2    5/2003    Nagano et al.
7,355,394 B2    4/2008    Lei et al.
(Continued)

FOREIGN PATENT DOCUMENTS

JP                5783408 B2    9/2015
KR    10-2013-0132507 A    12/2013
(Continued)

OTHER PUBLICATIONS

Korean Notice of Allowance dated Aug. 26, 2025 issued in Korean Patent Application No. 10-2021-0182151.

*Primary Examiner* — Hwa Andrew Lee
(74) *Attorney, Agent, or Firm* — Harness, Dickey & Pierce, P.L.C.

(57) ABSTRACT

Disclosed are semiconductor inspection apparatuses, systems, and methods. The semiconductor inspection method comprises heating a top surface of a semiconductor package, capturing the top surface of the heated semiconductor package to obtain thermal image data, and analyzing the thermal image data. The analyzing the thermal image data includes analyzing first thermal image data about the top surface at a first region of the semiconductor package, and analyzing second thermal image data about the top surface at a second region of the semiconductor package. The analyzing the first thermal image data includes obtaining first region data about temperature distribution at the top surface of the first region, and using the first region data to obtain thickness data of a cover molding layer about thickness distribution of the molding layer on the chip in the first region.

11 Claims, 12 Drawing Sheets

(58) Field of Classification Search
CPC ...... G06T 2207/10028; G01R 31/2896; G01R 31/2875; G01R 31/308; G01J 5/0025
See application file for complete search history.

(56) References Cited

U.S. PATENT DOCUMENTS

| | | |
|---|---|---|
| 9,541,377 B1 | 1/2017 | Yee et al. |
| 10,244,619 B2 | 3/2019 | Ohmori et al. |
| 10,504,761 B2 | 12/2019 | Amanullah |
| 10,876,830 B2 | 12/2020 | Hughes |
| 2002/0011852 A1 | 1/2002 | Mandelis et al. |
| 2013/0306358 A1* | 11/2013 | Ohmori .................. H05K 3/281 |
| | | 156/60 |
| 2018/0226283 A1* | 8/2018 | Amanullah .......... G01B 11/245 |
| 2018/0274904 A1 | 9/2018 | Miura et al. |
| 2018/0372487 A1* | 12/2018 | Irie ........................ G01N 25/18 |
| 2019/0114755 A1 | 4/2019 | Lee et al. |
| 2021/0223037 A1* | 7/2021 | Sohn ..................... G06T 7/0004 |

FOREIGN PATENT DOCUMENTS

| | | |
|---|---|---|
| KR | 10-1699273 B1 | 1/2017 |
| KR | 10-1877480 B1 | 8/2018 |
| KR | 10-2019-0041678 A | 4/2019 |
| KR | 10-2019-0107140 A | 9/2019 |
| KR | 10-2257259 B1 | 5/2021 |

\* cited by examiner

SEMICONDUCTOR INSPECTION METHOD INCLUDING HEATING A TOP SURFACE OF A SEMICONDUCTOR PACKAGE

CROSS-REFERENCE TO RELATED APPLICATION

This U.S. nonprovisional application claims priority under 35 U.S.C § 119 to Korean Patent Application No. 10-2021-0182151 filed on Dec. 17, 2021 in the Korean Intellectual Property Office, the disclosure of which is hereby incorporated by reference in its entirety.

BACKGROUND

Inventive concepts relate to a semiconductor inspection apparatus, a semiconductor inspection system including the same, and/or a semiconductor inspection method using the same, and more particularly, to a semiconductor inspection apparatus capable of measuring thickness of a mold, a semiconductor inspection system including the same, and/or a semiconductor inspection method using the same.

A semiconductor package is provided to implement an integrated circuit chip to qualify for use in electronic products. In general, the semiconductor package may be fabricated by mounting a semiconductor chip on a substrate, such as on a printed circuit board (PCB). A plurality of semiconductor chips may be mounted in a single semiconductor package. To guarantee performance of the semiconductor package, it may be required or desired to ascertain that the semiconductor chip is exactly or nearly exactly disposed on a substrate. Accordingly, an inspection may be performed on the semiconductor package.

SUMMARY

Some example embodiments of inventive concepts provide a semiconductor inspection apparatus capable of measuring thickness of a molding layer for each region, a semiconductor inspection system including the same, and/or a semiconductor inspection method using the same.

Alternatively or additionally, some example embodiments of inventive concepts provide a semiconductor inspection apparatus capable of detecting defects such as voids in a molding layer, a semiconductor inspection system including the same, and/or a semiconductor inspection method using the same.

Alternatively or additionally, some example embodiments of inventive concepts provide a semiconductor inspection apparatus capable of non-destructively recognizing an internal state, a semiconductor inspection system including the same, and/or a semiconductor inspection method using the same.

Alternatively or additionally, some example embodiments of inventive concepts provide a semiconductor inspection apparatus capable of using a three-dimensional (3D) sensing device to correct thickness of a molding layer, a semiconductor inspection system including the same, and/or a semiconductor inspection method using the same.

Example embodiments of inventive concepts are not limited to the mentioned above, and other objects which have not been mentioned above will be clearly understood to those of ordinary skill in the art from the following description.

According to some example embodiments of inventive concepts, a semiconductor inspection method may comprise: heating a top surface of a semiconductor package; capturing the top surface of the heated semiconductor package to obtain thermal image data about the top surface of the semiconductor package; and analyzing the thermal image data. The analyzing the thermal image data may include: analyzing first thermal image data about the top surface at a first region of the semiconductor package, the first region being provided with a chip; and analyzing second thermal image data about the top surface at a second region of the semiconductor package, the second region being provided with no chip. The analyzing the first thermal image data may include: obtaining first region data about temperature distribution at the top surface of the first region; and using the first region data to obtain thickness data of a cover molding layer about thickness distribution of a molding layer on the chip in the first region.

According to some example embodiments of inventive concepts, a semiconductor inspection method may comprise: using a three-dimensional (3D) sensing device to obtain 3D shape data about an outward appearance of a semiconductor package; heating a top surface of the semiconductor package; capturing the top surface of the heated semiconductor package to obtain thermal image data about the top surface of the semiconductor package; analyzing the 3D shape data; and analyzing the thermal image data. The analyzing the thermal image data may include: analyzing first thermal image data about the top surface at a first region of the semiconductor package, the first region being provided with a chip; and analyzing second thermal image data about the top surface at a second region of the semiconductor package, the second region being provided with no chip.

According to some example embodiments of inventive concepts, a semiconductor inspection apparatus may comprise: a three-dimensional (3D) sensing device configured to obtain 3D shape data about an outward appearance of a semiconductor package; a heating device configured to heat a top surface of the semiconductor package; a thermal image capture device configured to obtain thermal image data by capturing the top surface of the semiconductor package heated by the heating device; and a controller configured to use the 3D shape data and the thermal image data to calculate a thickness of a molding layer in the semiconductor package. The heating device may include a laser.

According to some example embodiments of inventive concepts, a semiconductor inspection system may comprise: a stage configured to support a semiconductor package; a stage drive mechanism configured to drive the stage to move in a horizontal direction; and a semiconductor inspection apparatus configured to perform an inspection on the semiconductor package that is on the stage. The semiconductor inspection apparatus may include: a laser generator configured to irradiate a linear laser beam on a top surface of the semiconductor package, the linear laser beam configured to extend in a direction that intersects a moving direction of the stage; a thermal image capture device configured to obtain thermal image data by capturing the top surface of the semiconductor package heated by the linear laser beam; and a controller configured to use the thermal image data to calculate a thickness of a molding layer in the semiconductor package.

Various example embodiments are included in the description and drawings.

DETAIL DESCRIPTION OF VARIOUS EXAMPLE EMBODIMENTS

Figure 1:
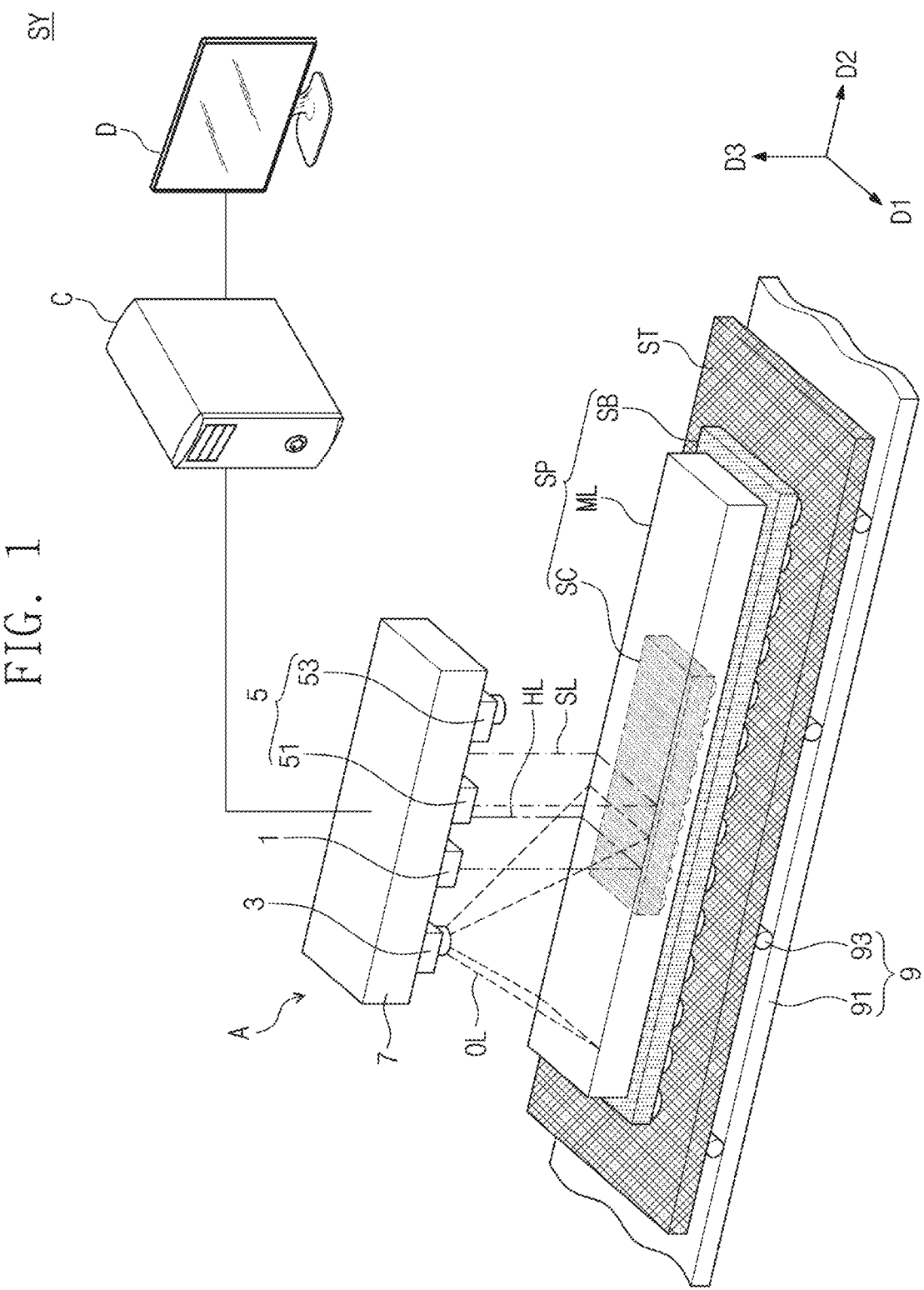
FIG. 1 illustrates a perspective view showing a semiconductor inspection system according to some example embodiments of inventive concepts.

The following will now describe some example embodiments of inventive concepts with reference to the accompanying drawings. Like reference numerals may indicate like components throughout the description.

Figure 2:
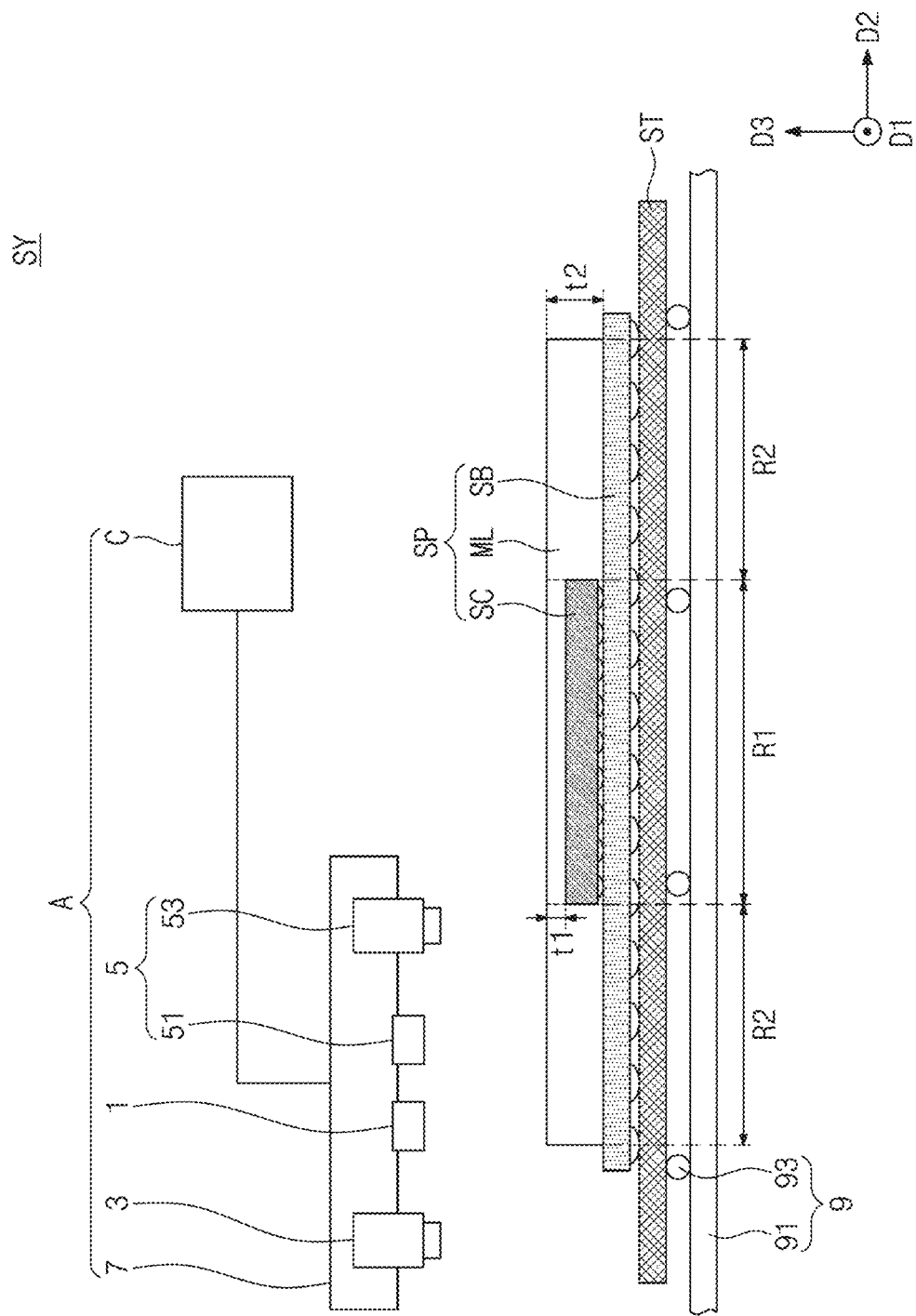
FIG. 2 illustrates a side view showing a semiconductor inspection system according to some example embodiments of inventive concepts.

FIG. 1 illustrates a perspective view showing a semiconductor inspection system according to some example embodiments of inventive concepts. FIG. 2 illustrates a side view showing a semiconductor inspection system according to some example embodiments of inventive concepts.

In this description, symbol D1 may indicate a first direction, symbol D2 may indicate a second direction that intersects the first direction D1 (for example at ninety degrees), and symbol D3 may indicate a third direction that intersects each of the first and second directions D1 and D2 (for example, also at ninety degrees to both the first and second direction D1 and D2). Each of the first and second directions D1 and D2 may be called a horizontal direction, and the third direction D3 may be called a vertical direction.

Referring to FIGS. 1 and 2, a semiconductor inspection system SY may be provided. The semiconductor inspection system SY may perform an inspection on a semiconductor package SP.

The semiconductor package SP may include a substrate SB, a chip SC, and a molding layer ML. The substrate SB may electrically connect the chip SC to the outside. The substrate SB may include one or more of a printed circuit board (PCB) or a redistribution substrate. The chip SC may be disposed on the substrate SB. FIG. 1 depicts that only one chip SC is stacked on the substrate SB, inventive concepts are not limited thereto. For example, a plurality of chips SC may be stacked, e.g., vertically stacked on the substrate SB. Alternatively or additionally, a plurality of chips SC may be disposed horizontally spaced apart from each other on a single substrate SB. On the substrate SB, the molding layer ML may encapsulate the chip SC. The molding layer ML may protect or at least partially protect the chip SC against external impact such as but not limited to shocks and/or radiation. The molding layer ML may include an epoxy molding compound (EMC), but inventive concepts are not limited thereto. As illustrated in FIG. 2, a first region R1 may be defined to indicate an area where the chip SC of the semiconductor package SP is disposed. In addition, a second region R2 may be defined to indicate an area where the chip SC of the semiconductor package SP is not disposed. A first thickness t1 may denote a thickness of the molding layer ML on the first region R1. The first thickness t1 may correspond to a thickness of the molding layer ML positioned on the chip SC. For example, the first thickness t1 may refer to a difference in level between a top surface of the chip SC and a top surface of the molding layer ML on the chip SC. The first thickness t1 may be irregular in a horizontal direction, or an upper surface of the chip SC may not be level with the horizontal direction. For example, as illustrated in FIG. 2, there may be a thickness difference between the molding layer ML on a left side in the first region R1 and the molding layer ML on a right side in the first region R1. The molding layer ML positioned on the first region R1 may be referred to as a cover molding layer. The molding layer ML positioned on the second region R2 may be referred to as a peripheral molding layer. A second thickness t2 may denote a thickness of the molding layer ML on the second region R2. The second thickness t2 may correspond to a difference in level between the top surface of the substrate SB and the top surface of the molding layer ML. The second thickness t2 may be different from the first thickness t1. For example, the second thickness t2 may be greater than the first thickness t1.

The molding layer ML may have a thermal conductivity different from that of the chip SC. The thermal conductivity of the molding layer ML may be less than that of the chip SC. For example, the thermal conductivity of the molding layer ML may range from about 2.0 W/m-K (Watts per meter-Kelvin) to about 5.0 W/m-K. For example, the thermal conductivity of the molding layer ML may range from about 2.5 W/m-K to about 4.3 W/m-K. The thermal conductivity of the chip SC may range from about 1,000 W/m-K to about 1,600 W/m-K. For example, the thermal conductivity of the chip SC may be about 1,300 W/m-K.

It is shown that the semiconductor package SP includes only one molding layer ML, but inventive concepts are not limited thereto. For example, the semiconductor package SP may be a package-on-package in which a plurality of semiconductor packages are vertically stacked. A detailed description thereof will be further discussed below.

The semiconductor inspection system SY may perform an inspection on the semiconductor package SP by measuring one or more of thicknesses of the molding layer ML and the chip SC. For example, the semiconductor inspection system SY may measure one or more of the first thickness t1 and the second thickness t2. In addition, the semiconductor inspection system SY may generate and display a visual image of outer and internal states of the semiconductor package SP. The semiconductor inspection system SY may include a semiconductor inspection apparatus A, a stage ST, a stage drive mechanism 9, and a display device D.

The semiconductor inspection apparatus A may perform inspection on the semiconductor package SP disposed on the stage ST. The semiconductor inspection apparatus A may include a heating device 1, a thermal image capture device 3, a three-dimensional (3D) sensing device 5, a measurement body 7, and a controller C.

The heating device 1 may heat a top surface of the semiconductor package SP disposed on the stage ST. The heating device 1 may use various ways to deliver energy to the top surface of the semiconductor package SP. For example, the heating device 1 may include or be a laser system that irradiates a laser beam to transfer heat to the top surface of the semiconductor package SP. When the heating device 1 uses a laser beam HL to heat the top surface of the semiconductor package SP, the heating device 1 may irradiate the laser beam HL that extends on the top surface of the semiconductor package SP. The heating device 1 may include one or more of a laser generator, a line beam generator, and a focus lens. The laser generator may be or may include a continuous wave (CW) laser generator. The CW laser generator may continuously generate the laser beam HL without interruption. The laser generator may oscillate a laser beam in response to a signal of the controller C. Alternatively or additionally, the laser generator may be a pulsed laser generator. The line beam generator may be configured such that the laser beam HL produced from the laser generator is modulated into a linear form. Therefore, the laser beam HL may become a linear beam that extends in the first direction D1 on the top surface of the semiconductor package SP. For example, the laser beam HL may be a linear laser beam. In this description below, the laser beam and the linear laser beam may be interchangeably used. The focus lens may adjust a focal point of the laser beam HL to allow the laser beam HL to have an appropriate width on the top surface of the semiconductor package SP. It is shown and described that the heating device 1 uses the laser beam HL to heat the top surface of the semiconductor package SP, but inventive concepts are not limited thereto. For example, the heating device 1 may alternatively or additionally use a light beam other than the laser beam and/or different means to transfer energy to the top surface of the semiconductor package SP.

The thermal image capture device 3 may use heat to capture the top surface of the semiconductor package SP. For example, the thermal image capture device 3 may be or may include an infrared (IR) camera. The thermal image capture device 3 may obtain an image whose color is changed based on temperature of the top surface of the semiconductor package SP. For example, the capturing of the thermal image capture device 3 may obtain a thermal image of the top surface of the semiconductor package SP. Alternatively or additionally, the thermal image capture device 3 may be or may include a hyperspectral imaging camera. The thermal image capture device 3 may include a spectroscope between a lens and a camera. The thermal image capture device 3 may receive a wide wavelength range as continuous data that are different in accordance with wavelength. The thermal image capture device 3 may include a camera and a lens that correspond to another structure capable of obtaining a thermal image. The thermal image capture device 3 may capture the top surface of the semiconductor package SP that is heated by the heating device 1. For example, the thermal image capture device 3 may capture a portion of the top surface of the semiconductor package SP heated by the heating device 1. For example, the thermal image capture device 3 may have an angle of view OL that includes an area where the laser beam HL is irradiated or that covers a portion of the top surface of the semiconductor package SP. Inventive concepts, however, are not limited thereto, and the thermal image capture device 3 may alternatively or additionally be configured such that an entire top surface of the semiconductor package SP is captured at one time. For example, the angle of view OL of the thermal image capture device 3 may cover the entire top surface of the semiconductor package SP.

The 3D sensing device 5 may obtain a 3D shape data about an outward appearance of the semiconductor package SP. For example, the 3D sensing device 5 may be used to obtain data about depth of the semiconductor package SP. The 3D sensing device 5 may include various configurations for obtaining data about depth of the semiconductor package SP. For example, the 3D sensing device 5 may include a structured light camera such as a structured light camera module. In this case, the 3D sensing device 5 may include a structured light source 51 and a structured light detector 53. The structured light source 51 may irradiate a structured light SL on the top surface of the semiconductor package SP. The structured light SL may be or may include a linear beam that extends in the first direction D1 on the top surface of the semiconductor package SP, but inventive concepts are not limited thereto. For example, the structured light SL may be a lattice-shaped beam. The structured light SL may include a laser beam. The structured light detector 53 may capture the structured light SL irradiated on the semiconductor package SP. The structured light detector 53 may be or may include a camera to capture the structured light SL. It may be possible to obtain data about thickness of the semiconductor package SP by analyzing varied shapes of the structured light SL captured by the structured light detector 53. It is shown and described that the 3D sensing device 5 is a structured light camera module in which a structured light is used, but inventive concepts are not limited thereto. For example, the 3D sensing device 5 may alternatively or additionally include a stereo vision camera or camera module and/or a time of flight (ToF) camera module. When the 3D sensing device 5 includes a stereo vision camera module, the 3D sensing device 5 may use triangulation to obtain data about thickness of the semiconductor package SP. When the 3D sensing device 5 includes a ToF camera module, the 3D sensing device 5 may use travel-time of light to obtain data about thickness of the semiconductor package SP. In this case, the 3D sensing device 5 may include one or more of an indirect ToF camera module and a direct ToF cameral module. Alternatively or additionally, the 3D sensing device 5 may include another structure to obtain 3D shape data about an outward appearance of the semiconductor package SP.

The measurement body 7 may be rigidly coupled to each of or at least one of the heating device 1, the thermal image capture device 3, and the 3D sensing device 5. For example, the measurement body 7 may allow connection to each other of the heating device 1, the thermal image capture device 3, and the 3D sensing device 5. The measurement body 7 may affix a relative distance between the heating device 1, the thermal image capture device 3, and the 3D sensing device 5. The measurement body 7 may be or may include, for example, a chassis and/or arms and/or a solid body to which each of the heating device 1, the thermal image capture device 3, and the 3D sensing device 5 are affixed. Each of the heating device 1, the thermal image capture device 3, and the 3D sensing device 5 may be able to exchange communication, e.g., wireless and/or over a wired bus, with others of the heating device 1, the thermal image capture device 3, and the 3D sensing device 5. The bus may be included in or within the measurement body 7.

The controller C may control one or more of the heating device 1, the thermal image capture device 3, and the 3D sensing device 5. The controller C may receive data transmitted from one or more of the thermal image capture device 3 and the 3D sensing device 5. The controller C may analyze thermal image data transmitted from the thermal image capture device 3. In addition, the controller C may analyze 3D shape data transmitted from the 3D sensing device 5. Alternatively or additionally, the controller C may correct thermal image data transmitted from the thermal image capture device 3 by using 3D shape data transferred from the 3D sensing device 5. The controller C may be provided computer-executable instructions as recordable media. The commands may be stored in the form of program codes. When the instruction are executed by a processor, a process module is generated to perform an operation of disclosed embodiments. The recordable media may be provided in the shape of computer-readable record media. The computer-readable record media may include all kinds of record media in which are stored instructions that can be interpreted by a computer. For example, the record media may include read only memory (ROM), random access memory (RAM), magnetic tapes, Flash memory, or optical data storages. The controller C will be further discussed below in detail.

The stage ST may support the semiconductor package SP. The semiconductor package SP may be disposed on the stage ST and be inspected by the semiconductor inspection apparatus A. The stage ST may move in a horizontal direction. For example, the stage ST may move in a direction opposite to or at right angles with the second direction D2. The semiconductor package SP may be inspected by the semiconductor inspection apparatus A, while the stage ST moves the semiconductor package SP in a direction opposite to the second direction D2. A single semiconductor package SP may be disposed on a single stage ST. Inventive concepts, however, are not limited thereto, and a plurality of semiconductor packages SP may be provided on a single stage ST. The stage ST may be provided in plural. The plurality of stages ST may be disposed spaced apart from each other in the second direction D2. A single stage ST will be discussed below for the purpose of convenience.

A stage temperature control device may control a temperature of the stage ST. For example, the stage temperature control device may control the stage ST to have a temperature within a certain range. A temperature of the semiconductor package SP disposed on the stage ST may be controlled by controlling the temperature of the stage ST. Before the semiconductor package SP is inspected, it may be required or desired that the semiconductor package SP maintain its temperature at a certain level. The stage temperature control device may be configured such that the temperature of the stage ST is maintained at a certain level to control the semiconductor package SP on the stage ST to have a temperature at a certain level before the semiconductor package SP is inspected. Therefore, the semiconductor package SP may be exactly or more exactly inspected. The stage temperature control device may include various configurations to control the temperature of the stage ST. For example, the stage temperature control device may be provided in the shape of one or more of at least one hot wire that uses Joule heat to heat the stage ST and a cooling passage through which a cooling fluid such as water or a gas (e.g., air and/or an inert gas) flows. Either or both of the hot wire and the cooling passage may be incorporated within the stage ST; however, example embodiments are not limited thereto. The stage temperature control device may be embedded in the stage ST. For example, the stage ST may be provided therein with one or more of a hot wire and a cooling passage. Alternatively or additionally, the stage temperature control device may be positioned outside the stage ST. The stage temperature control device may be disposed on a bottom or lateral side of the stage ST to exchange heat with the stage ST. Inventive concepts, however, are not limited thereto, and the stage temperature control device may alternatively or additionally be provided in another shape to control the temperature of the stage ST.

The stage drive mechanism 9 may drive the stage ST to move, for example in a horizontal direction. The stage drive mechanism 9 may include a belt 91 and a roller 93. For example, the stage ST may be moved by the stage drive mechanism 9 in the shape of conveyor belt. Inventive concepts, however, are not limited thereto, and the stage drive mechanism 9 may alternatively or additionally include various configurations to move the stage ST. For example, the stage drive mechanism 9 may include any actuator, such as an electric motor and/or a hydraulic machine.

The display device D may be connected to the controller C. The controller C may generate a visual image of the semiconductor package SP, and the visual image may be shown on the display device D. Alternatively or additionally, the display device D may show thereon contents of data interpreted by the controller C. A detailed description thereof will be further discussed below.

Figure 3:
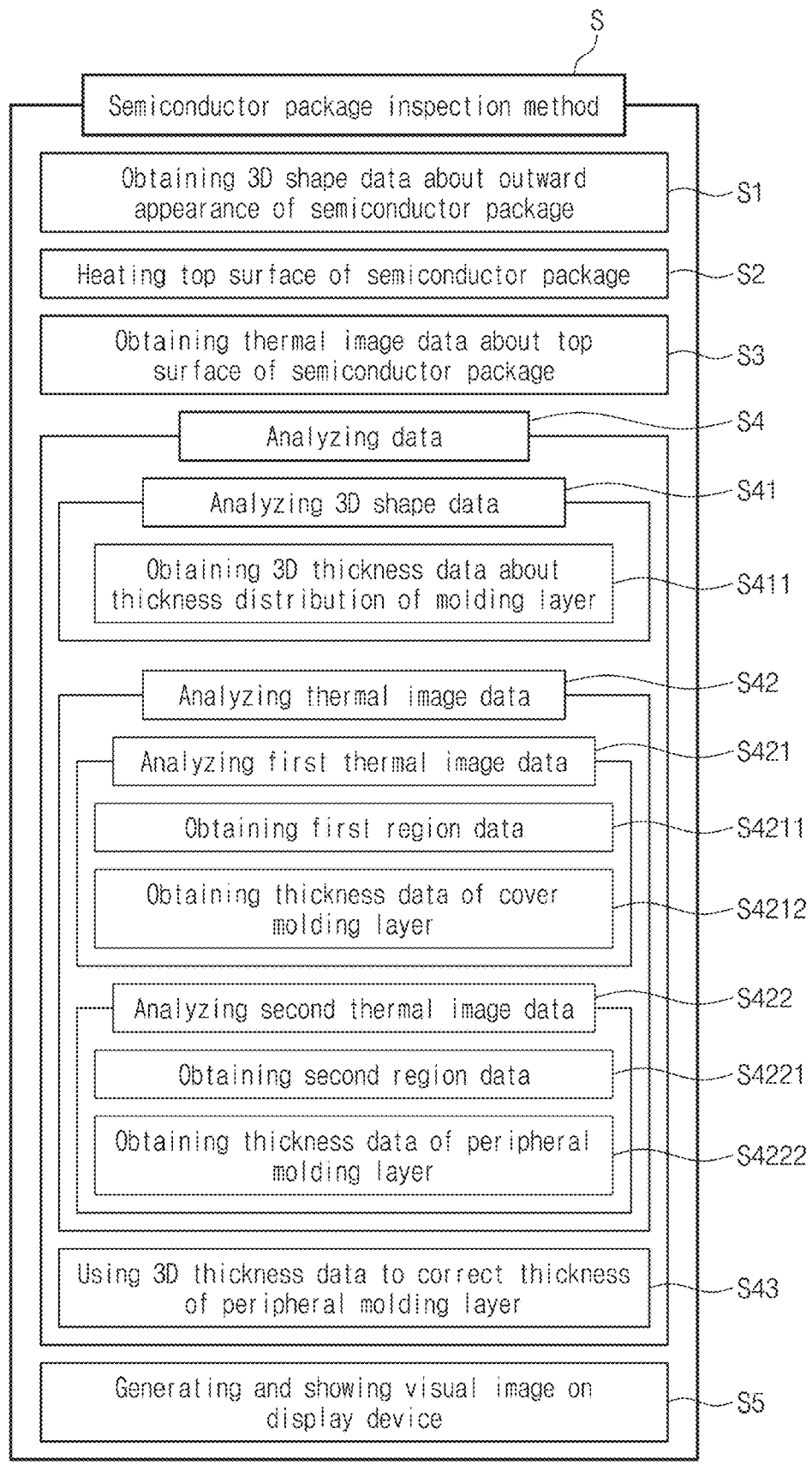
FIG. 3 illustrates a flow chart showing a semiconductor inspection method according to some example embodiments of inventive concepts.

FIG. 3 illustrates a flow chart showing a semiconductor inspection method according to some example embodiments of inventive concepts.

Referring to FIG. 3, a semiconductor inspection method S may be provided. The semiconductor inspection method S may correspond to a method in which the semiconductor inspection system (see SY of FIG. 1) discussed with reference to FIGS. 1 and 2 is used to inspect the semiconductor package (see SP of FIG. 1). The semiconductor inspection method S may include a step S1 of obtaining 3D shape data about an outward appearance of a semiconductor package, a step S2 of heating a top surface of the semiconductor package, a step S3 of obtaining thermal image data about the top surface of the semiconductor package, a step S4 of analyzing data, and a step S5 of generating and showing a visual image on a display device.

The data analysis step S4 may include a step S41 of analyzing the 3D shape data, a step S42 of analyzing the thermal image data, and a step S43 of using 3D thickness data to correct thickness data of a peripheral molding layer.

The 3D shape data analysis step S41 may include a step S411 of obtaining 3D thickness data about thickness distribution of the molding layer.

The thermal image data analysis step S42 may include a step S421 of analyzing first thermal image data and a step S422 of analyzing second thermal image data.

The first data analysis step S421 may include a step S4211 of obtaining first region data and a step S4212 of obtaining thickness data of a cover molding layer.

The second data analysis step S422 may include a step S4221 of obtaining second region data and a step S4222 of obtaining thickness data of a peripheral molding layer.

It is shown that the steps of the semiconductor inspection method S are sequentially performed, but inventive concepts are not limited thereto. For example, the 3D shape data obtaining step S1 may be preceded by the thermal image data obtaining step S3. Alternatively or additionally, the 3D shape data analysis step S41 may be preceded by the thermal image data analysis step S42. Furthermore, there may be a step (not illustrated) of manufacturing a semiconductor package based on the inspection performed, for example based on the visual image data and/or based on the 3D thickness data.

With reference to FIGS. 4 to 11, the following will describe in detail steps of the semiconductor inspection method S of FIG. 3.

Figure 4:
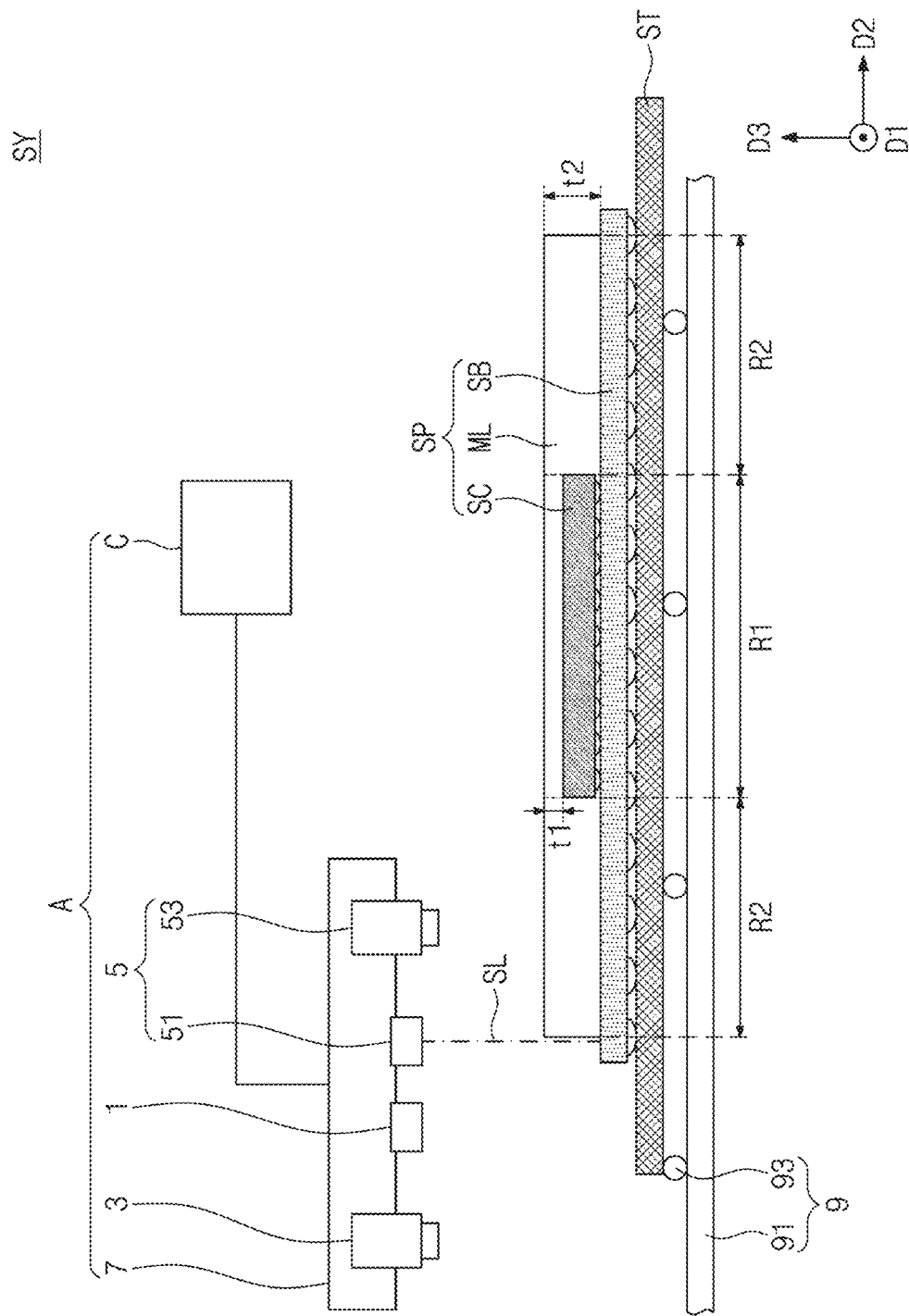
FIGS. 4 to 6 illustrate side views showing a semiconductor inspection method according to the flow chart of FIG. 3.
Figure 5:
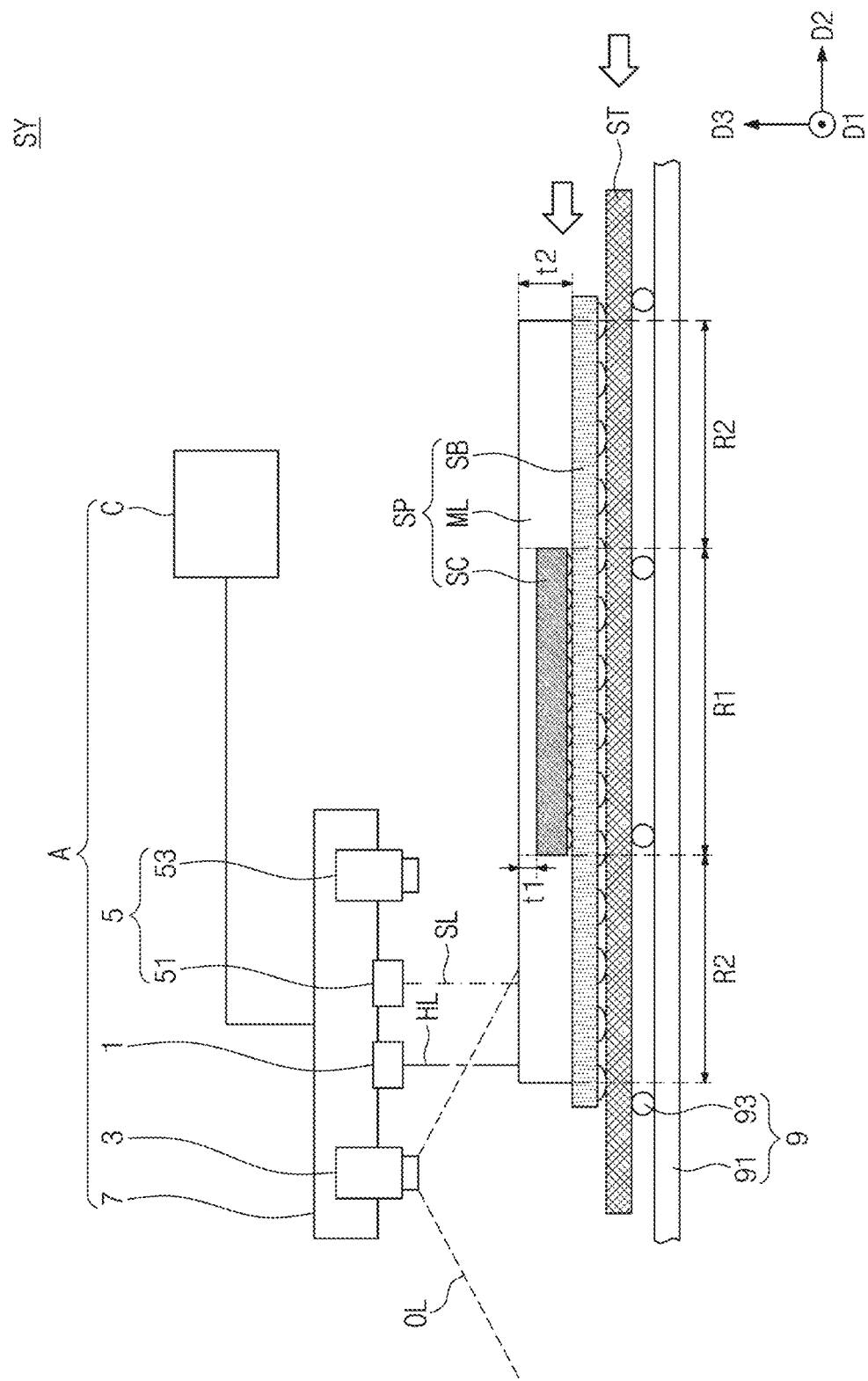
Figure 6:
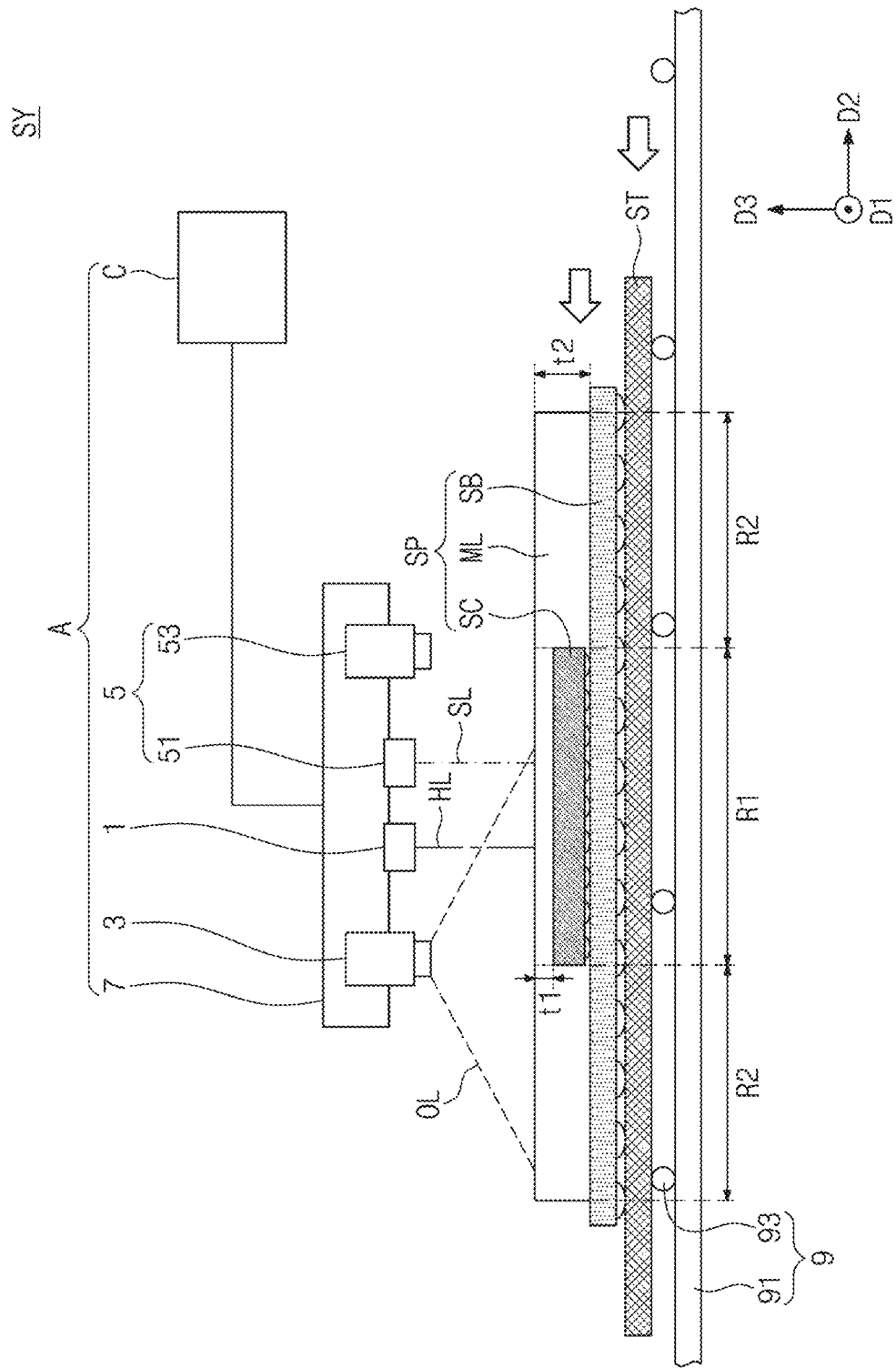

FIGS. 4 to 6 illustrate side views showing a semiconductor inspection method according to the flow chart of FIG. 3.

Referring to FIGS. 3 and 4, the stage temperature control device may be used to control a temperature of the stage ST. Therefore, the semiconductor package SP disposed on the stage ST may have a temperature that is controlled to be at a certain level or within a certain range.

The 3D shape data obtaining step S1 may include allowing the 3D sensing device 5 to irradiate the structured light SL on a top surface or an upper surface of the semiconductor package SP. For example, the structured light SL may be irradiated on a top surface of the molding layer ML and a top surface of the substrate SB. As illustrated in FIG. 1, the structured light SL may extend in the first direction D1 on the top surface of the semiconductor package SP. There may be a difference in levels between the top surface of the molding layer ML and the top surface of the substrate SB, and the level difference may cause distortion of a linear shape of the structured light SL when the structured light SL is viewed from side. The structured light detector 53 may capture the structured light SL irradiated on the top surface of the semiconductor package SP. The stage ST may move in a direction such as a horizontal direction that is opposite to the second direction D2. Therefore, the structured light SL may be sequentially irradiated on an entire top surface of the semiconductor package SP. The structured light detector 53 may provide the controller C with information about the structured light SL irradiated on the top surface of the semiconductor package SP. The controller C may use the information transmitted from the structured light detector 53 to analyze three-dimensional (3D) shape data about an outward appearance of the semiconductor package SP. The 3D shape data may include one or more of a thickness of the substrate SB, a length of the molding layer ML, a width of the molding layer ML, and a thickness of the molding layer ML.

Referring to FIGS. 3 and 5, the heating step S2 may include allowing the heating device 1 to irradiate a linear laser beam HL to the top surface of the semiconductor package SP. As discussed above, the linear laser beam HL may extend a certain length in the first direction D1 on the top surface of the semiconductor package SP. The top surface of the semiconductor package SP may be heated at its portion on which the linear laser beam HL is irradiated. For example, the top surface of the semiconductor package SP may have an increased temperature at its portion on which the linear laser beam HL is irradiated. When the semiconductor package SP has an increased temperature at the top surface thereof, an energy may be downwardly transmitted. For example, heat may be downwardly transferred from the top surface of the molding layer ML. Therefore, the molding layer ML may have an increased temperature at a portion beneath the top surface thereof. While the linear laser beam HL is irradiated, the semiconductor package SP may move in a horizontal direction. For example, the stage ST may cause the semiconductor package SP, on which the linear laser beam HL is irradiated, to move in a direction opposite to the second direction D2. Accordingly, the linear laser beam HL may be sequentially irradiated on an entire top surface of the semiconductor package SP. As heat is downwardly transferred from the top surface of the molding layer ML, the top surface of the molding layer ML may have a reduced temperature at its portion where the irradiation of the linear laser beam HL is terminated. The temperature reduction of the top surface of the molding layer ML may be changed due to the thermal conductivity of a material present beneath the top surface of the molding layer ML. For example, the thermal conductivity of the material present beneath the top surface of the molding layer ML may change a temperature distribution of the top surface of the molding layer ML where the irradiation of the linear laser beam HL is terminated.

Referring to FIGS. 3 and 6, the thermal image data obtaining step S3 may include allowing the thermal image capture device 3 to capture the top surface of the semiconductor package SP. It may be observed that there is a difference in color between the portion whose temperature is increased by the linear laser beam HL and the portion whose temperature is decreased after the irradiation of the linear laser beam HL. Therefore, the thermal image capture device 3 may obtain thermal image data about temperature distribution on the top surface of the semiconductor package SP. The thermal image capture device 3 may provide the controller C with the thermal image data obtained by capturing the top surface of the semiconductor package SP. The controller C may analyze the thermal image data transmitted from the thermal image capture device 3.

Referring back to FIG. 3, the 3D thickness data obtaining step S411 may include allowing the controller C to analyze 3D shape data to obtain data about thickness distribution of the molding layer ML. When the 3D sensing device 5 includes a structured light camera or a structured light camera module, the controller C may change a distorted shape of the structured light SL to calculate a thickness of the molding layer ML. The controller C may obtain data about the second thickness t2. The second thickness t2 may be changed depending on position. The controller C may obtain data about distribution of the second thickness t2 that is changed depending on position.

Figure 7:
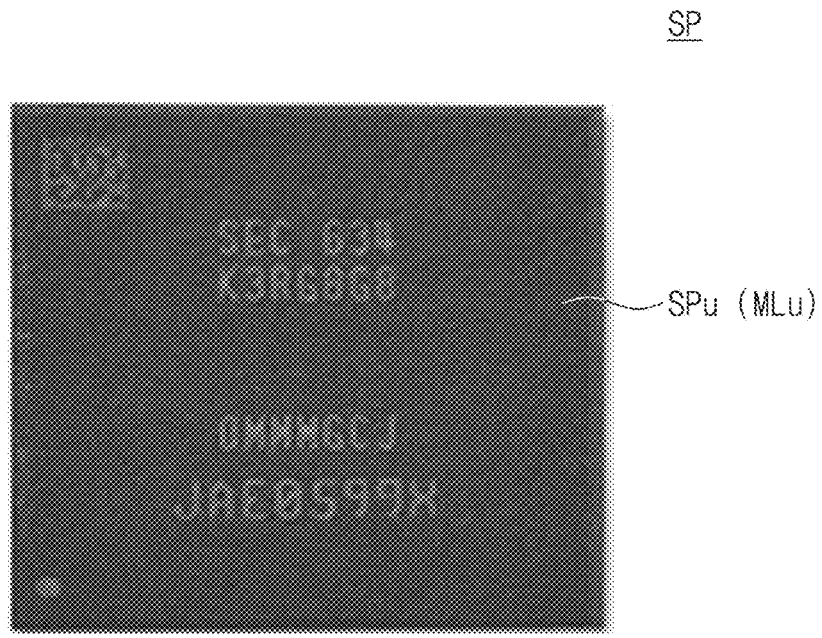
FIG. 7 illustrates a plan view showing a top surface of a semiconductor package according to some example embodiments of inventive concepts.
Figure 8:
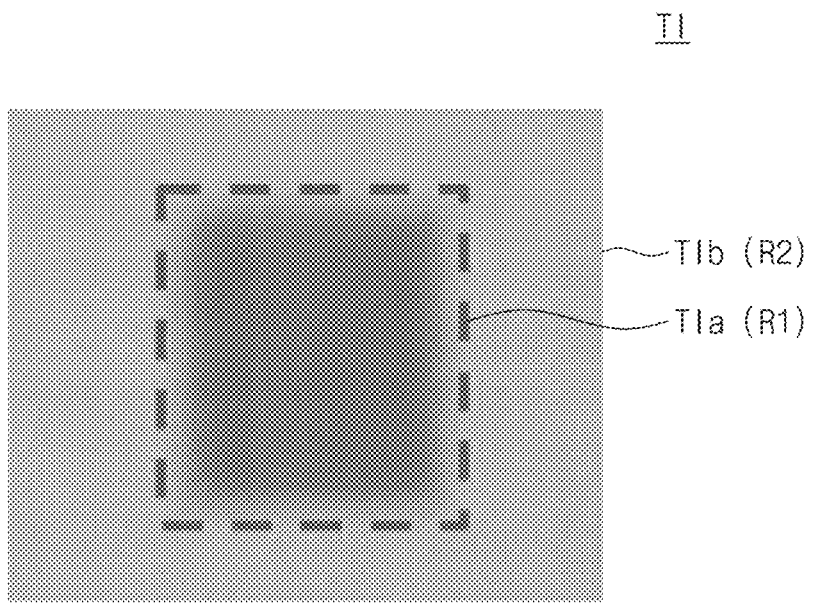
FIG. 8 illustrates a thermal image of a top surface of a semiconductor package according to some example embodiments of inventive concepts.

FIG. 7 illustrates a plan view showing a top surface of a semiconductor package according to some example embodiments of inventive concepts. FIG. 8 illustrates a thermal image of a top surface of a semiconductor package according to some example embodiments of inventive concepts.

Referring to FIG. 7, there may be provided an image such as a black-and-white image or a color image showing a top surface SPu of the semiconductor package SP. Differently from that shown in FIG. 1, when the molding layer ML does not entirely cover the top surface of the substrate (see SB of FIG. 1), a top surface SPu of the semiconductor package SP may be a top surface MLu of the molding layer ML.

Referring to FIG. 8, there may be a thermal image TI of the top surface of the semiconductor package SP. The thermal image TI may be or may include data transmitted from the thermal image capture device (see 3 of FIG. 1) to the controller (see C of FIG. 1). A thermal image of the first region R1 may be called a first thermal image TIa. A thermal image of the second region R2 may be called a second thermal image TIb. The thermal image TI may show different colors and/or different grey-scales depending on temperature. As the molding layer (see ML of FIG. 1) has thermal conductivity less than that of the chip (see SC of FIG. 1), a relative increase in thickness of the molding layer ML may induce a relative increase in temperature. Therefore, the second region R2 may have a temperature greater than that of the first region R1.

Figure 9:
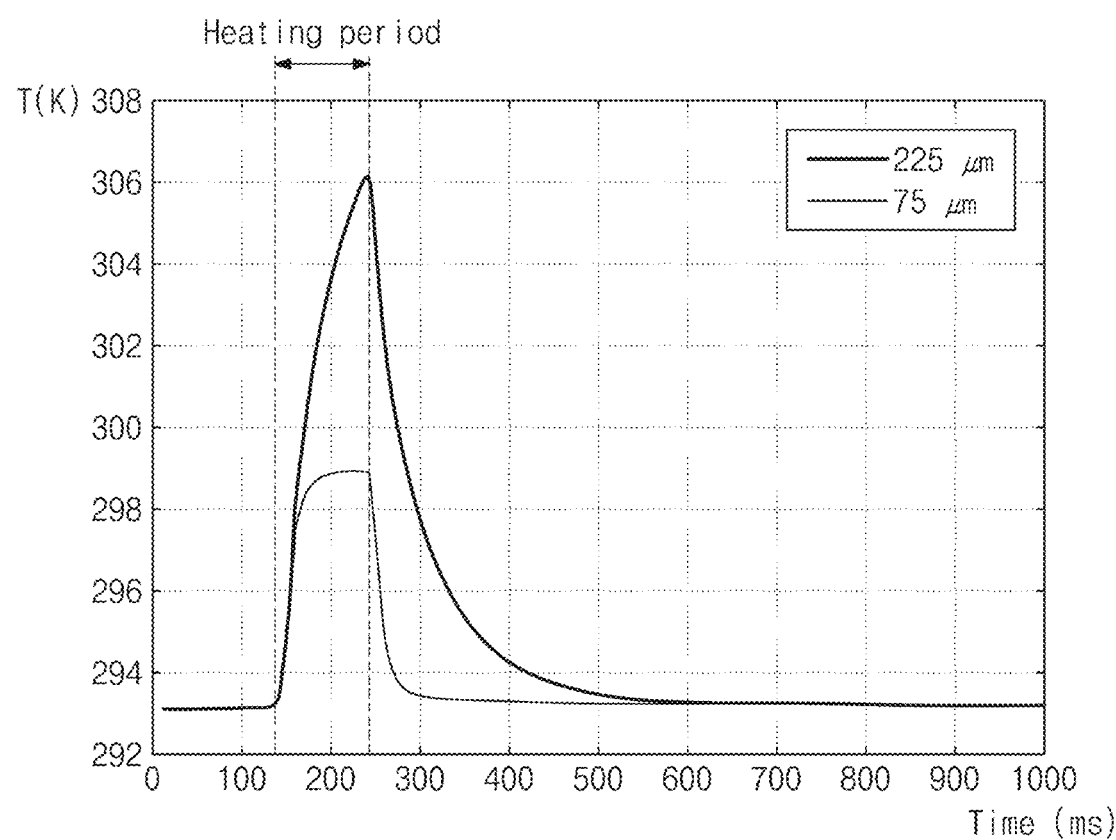
FIG. 9 illustrates a graph showing a variation in temperature with time after heating a top surface of a semiconductor package.
Figure 10:
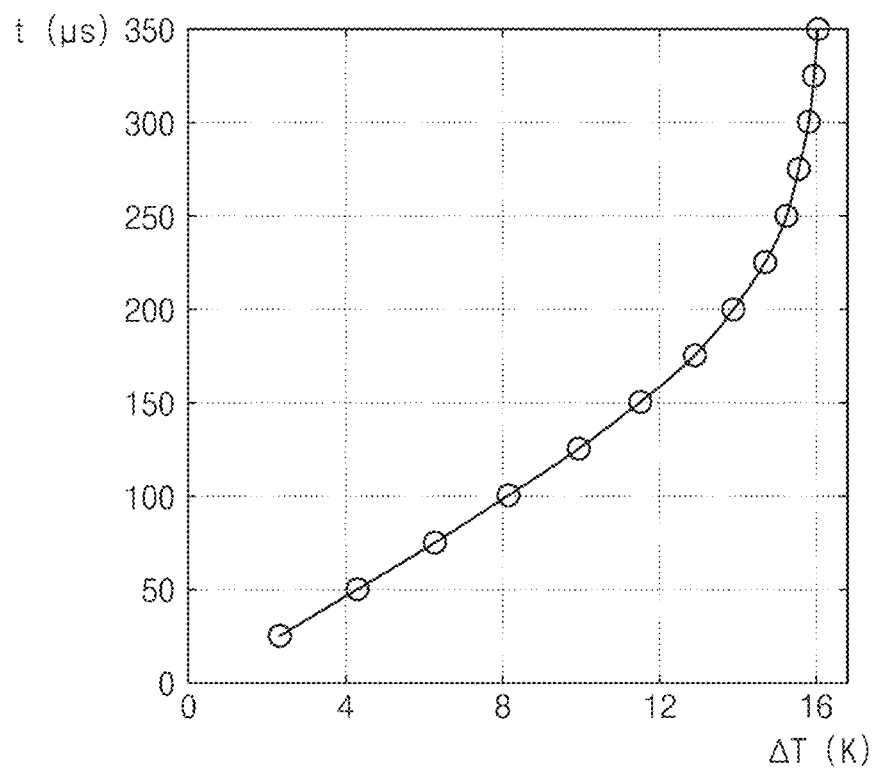
FIG. 10 illustrates a graph showing a variation in temperature with thickness of a molding layer after heating a top surface of a semiconductor package.

FIG. 9 illustrates a graph showing a variation in temperature with time after heating a top surface of a semiconductor package. FIG. 10 illustrates a graph showing a variation in temperature with thickness of a molding layer after heating a top surface of a semiconductor package.

Referring to FIG. 9, there may be provided a graph showing a variation in temperature at a top surface of a molding layer before and after irradiation of a linear laser beam on the top surface of the molding layer. A horizontal axis may correspond to a time (in arbitrary units such as in millisecond). A vertical axis may correspond to a temperature (in arbitrary units such as in K) at the top surface of the molding layer. A controller may use thermal image data to generate the graph of FIG. 9 showing the temperature at the top surface of the molding layer.

One of two plots in the graph of FIG. 9 may indicate a variation in temperature at the top surface of the molding layer whose thickness is about 225 microns (μm). The other of two plots in the graph of FIG. 9 may indicate a variation in temperature at the top surface of the molding layer whose thickness is about 75 μm. The graph may be used to obtain a temperature variation ΔT between before and after heating using a linear laser beam. The temperature variation ΔT may be determined in various ways. For example, the temperature variation ΔT may be given by or be based on the following equation.

$$\Delta T = \sqrt{((T(t_a) - T(t_a))^2 + (T(t_a) - T(t_b))^2)} \quad \text{[Equation 1]}$$

In Equation 1, the term $T(t_a)$ may correspond to a temperature at a surface of the molding layer at time $t_a$. Likewise, the term $T(t_0)$ may be a temperature at the surface of the molding layer at time $t_0$, and the term $T(t_b)$ may be a temperature at the surface of the molding layer at time $t_b$. The term $t_a$ may indicate a time when a maximum temperature is reached at the top surface of the molding layer heated by the linear laser beam. The term $t_0$ may indicate a time before the molding layer is heated by the linear laser beam. The term $t_b$ may indicate a time when a certain time period has elapsed after the molding layer is heated by the linear laser beam.

For another example, the temperature variation ΔT may be given by or be based on the following equation.

$$\Delta T = \tan^{-1}\left(\frac{T(t_a) - T(t_b)}{T(t_a) - T(t_0)}\right) \quad \text{[Equation 2]}$$

Inventive concepts, however, are not limited thereto, and the temperature variation ΔT may be determined in other ways.

Referring to FIG. 10, there may be provided a graph showing how a thickness of the molding layer varies with the temperature variation ΔT. A horizontal axis may correspond to the temperature variation ΔT. A vertical axis may correspond to a thickness (e.g. in m) at the top surface of the molding layer. It may be empirically determine the thickness of the molding layer in accordance with the temperature variation ΔT. For example, the graph of FIG. 10 may be experimentally obtained. A curve fitting model may be used to generate the ΔT-thickness graph of FIG. 10. The ΔT-thickness graph of FIG. 10 may be, for example, expressed by or be based on a polynomial equation such as a best-fit polynomial equation, for example as a cubic equation as follows.

$$\tau = 0.26(\Delta T)^2 + 6.25(\Delta T)^2 + 58.33(\Delta T)^2 \quad \text{[Equation 3]}$$

In Equation 3, the term t may indicate the thickness of the molding layer. Inventive concepts, however, are not limited thereto, and the ΔT-thickness graph may be determined in other ways.

Referring back to FIG. 3, the first region data obtaining step S4211 may include allowing the controller C to obtain a graph like that of FIG. 9 with respect to the first region R1. The thickness data obtaining step S4212 may include allowing the controller C to obtain a graph like that of FIG. 10 with respect to the first region R1. A ΔT-thickness graph like that of FIG. 10 with respect to the first region R1 may be obtained to calculate the thickness of the molding layer on the first region R1.

The second data obtaining step S4221 may include allowing the controller C to obtain a graph like that of FIG. 9 with respect to the second region R2. The thickness data obtaining step S4222 may include allowing the controller C to obtain a graph like that of FIG. 10 with respect to the second region R2. A ΔT-thickness graph like that of FIG. 10 with respect to the second region R2 may be obtained to calculate the thickness of the molding layer on the second region R2.

The data analysis step S422 may further include using second region data to determine the presence of void, crack, delamination, or foreign contamination on the molding layer ML in the second region R2. For example, the controller C may analyze second thermal image data to detect defects in the molding layer ML.

Figure 11:
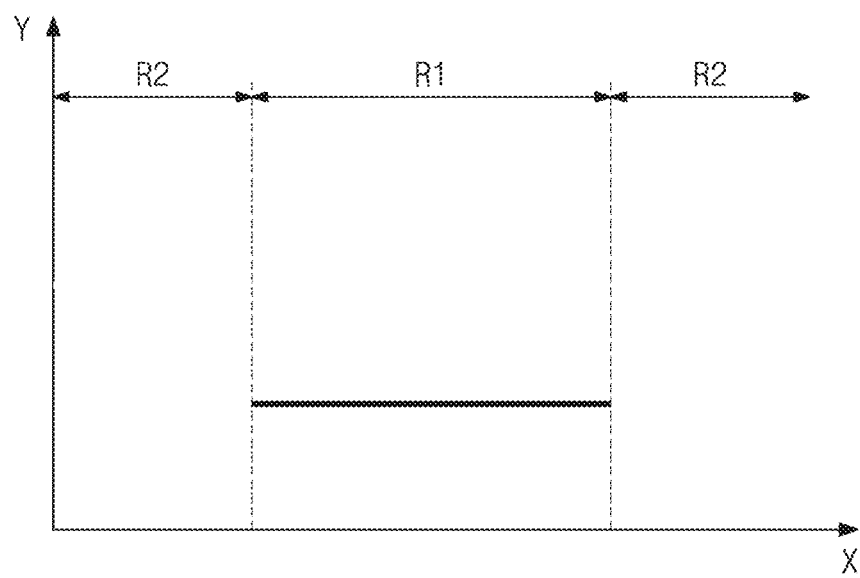
FIG. 11 illustrates a graph showing a thickness of a molding layer in a semiconductor package according to some example embodiments of inventive concepts.

FIG. 11 illustrates a graph showing a thickness of a molding layer in a semiconductor package according to various example embodiments of inventive concepts.

Referring to FIG. 11, the graphs of FIGS. 9 and 10 may be used to obtain a graph showing the thickness of the molding layer on the first region R1 and the second region R2. The thickness of the molding layer on the first region R1 may be less than that of the molding layer on the second region R2.

Referring again to FIG. 3, the thickness data correction step S43 may include using 3D thickness data to correct the thickness of the molding layer on the second region R2. Compared to a case where the thickness of the molding layer is obtained by analyzing the thermal image data, the thickness of the molding layer may be relatively exactly obtained by using the 3D thickness data. Therefore, the 3D thickness data may be used to correct the thermal image data. Accordingly, it may be possible to accurately inspect the thickness of the molding layer. In addition, even thought the thickness of the molding layer is slightly different for each semiconductor package, the thickness of the molding layer may be corrected to exactly inspect the thickness of the molding layer on the first region.

Figure 12:
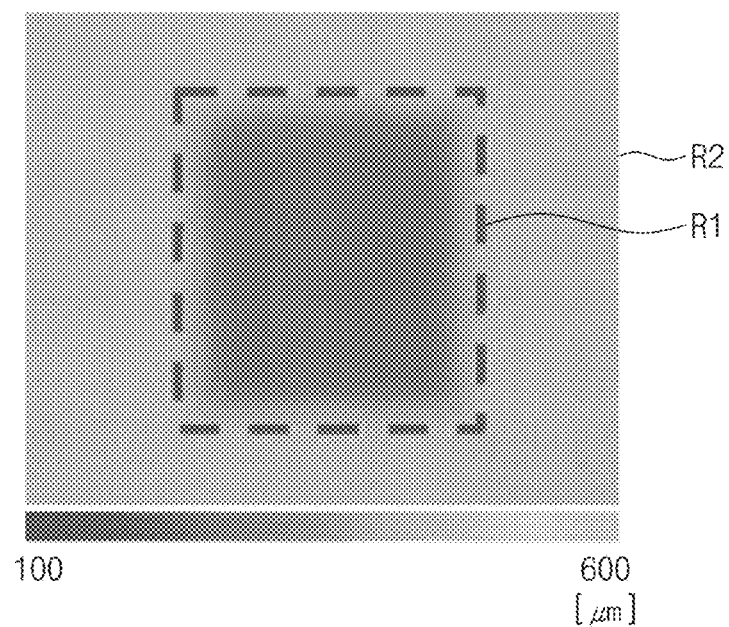
FIG. 12 illustrates a visual image expressed on a display device, showing a semiconductor package according to some example embodiments of inventive concepts.

FIG. 12 illustrates a visual image expressed on a display device, showing a semiconductor package according to some example embodiments of inventive concepts.

Referring to FIGS. 3 and 12, the display step S5 may include displaying a visual image VI on the display device (see D of FIG. 1). The visual image VI may include information about the thickness of the molding layer obtained based on the thermal image data. For example, a bar graph shown at bottom of FIG. 12 may indicate the thickness of the molding layer. Accordingly, it may be possible to recognize the thickness of the molding layer on the first region R1 and the second region R2.

According to a semiconductor inspection apparatus, a semiconductor inspection system including the same, and a semiconductor inspection method using the same in accordance with some example embodiments of inventive concepts, it may be possible to measure a thickness of a molding layer in a semiconductor package. For example, the thickness of the molding layer in the semiconductor package may be measured for each region. For more detail, it may be possible to measure the thickness of the molding layer which is supposed to be position on a chip. Therefore, when the molding layer on the chip is thinner than a certain level, the molding layer may be determined to be defective and filtered out. Alternatively, when the molding layer has therein defects such as voids, the molding layer may be determined to be defective and filtered out. In addition, the procedure mentioned above may be used to improve fabrication process and to increase a manufacturing yield.

According to a semiconductor inspection apparatus, a semiconductor inspection system including the same, and a semiconductor inspection method using the same in accordance with some example embodiments of inventive concepts, a three-dimensional (3D) sensing device may be used to correct the measurement of the molding layer. Therefore, exact results may be obtained compared to a case where only a thermal image measurement device is employed for thickness measurement.

According to a semiconductor inspection apparatus, a semiconductor inspection system including the same, and a semiconductor inspection method using the same in accordance with some example embodiments of inventive concepts, it may be possible to non-destructively recognize an internal structure of the semiconductor package. In this case, as the semiconductor package can be inspected without being fractured, a total inspection may be practicably performed.

Figure 13:
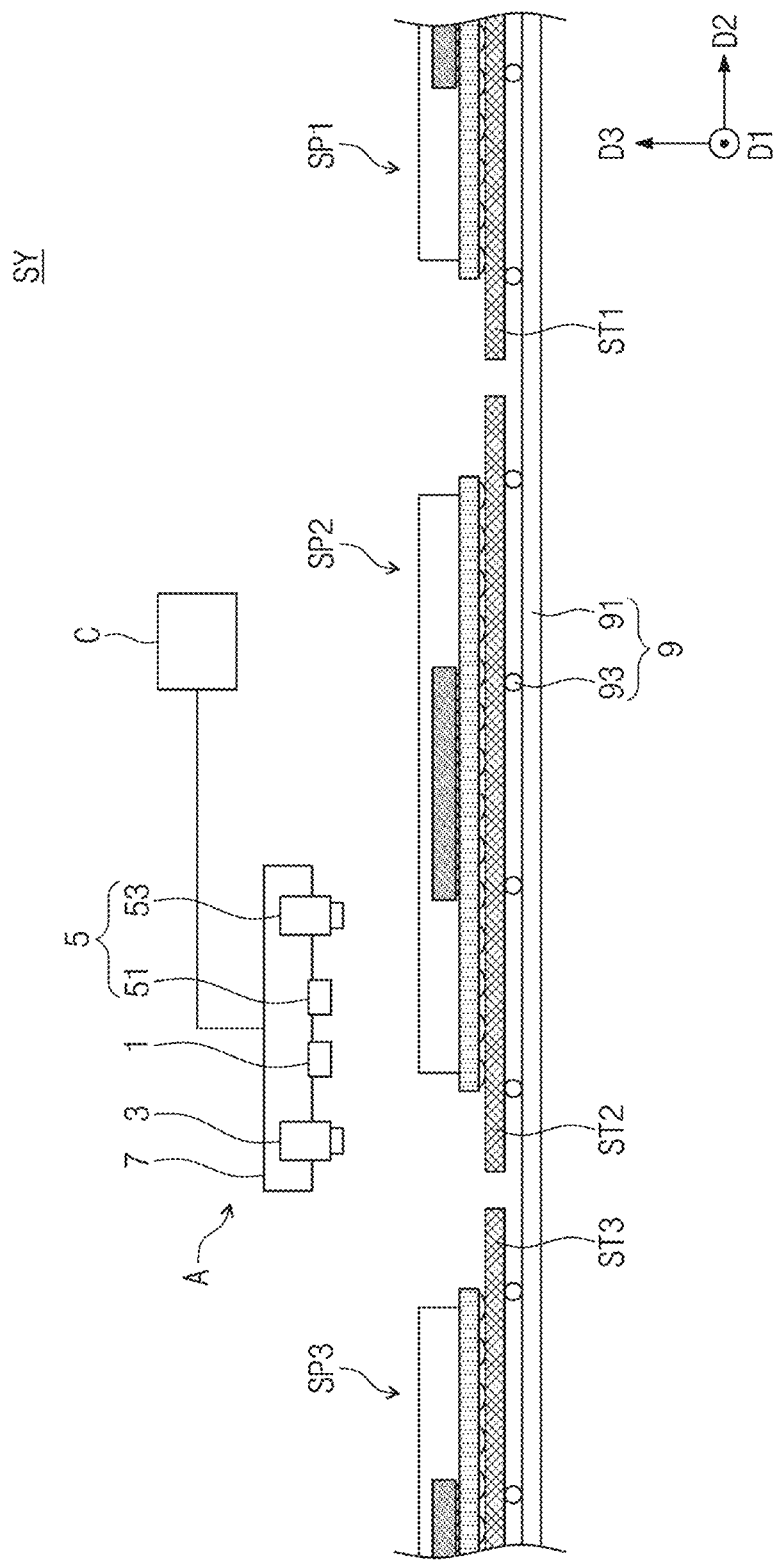
FIG. 13 illustrates a side view showing a semiconductor inspection system according to some example embodiments of inventive concepts.

FIG. 13 illustrates a side view showing a semiconductor inspection system according to some example embodiments of inventive concepts.

For convenience of description, the following will omit the description substantially the same as or similar to that discussed with reference to FIGS. 1 to 12.

Referring to FIG. 13, a plurality of stages ST1, ST2, and ST3 may be provided. The plurality of stages ST1, ST2, and ST3 may be disposed on one stage drive mechanism 9. A plurality of semiconductor packages SP1, SP2, and SP3 may be correspondingly disposed on the plurality of stages ST1, ST2, and ST3. Therefore, one semiconductor inspection apparatus A may be used to continuously inspect the plurality of semiconductor packages SP1, SP2, and SP3.

Figure 14:
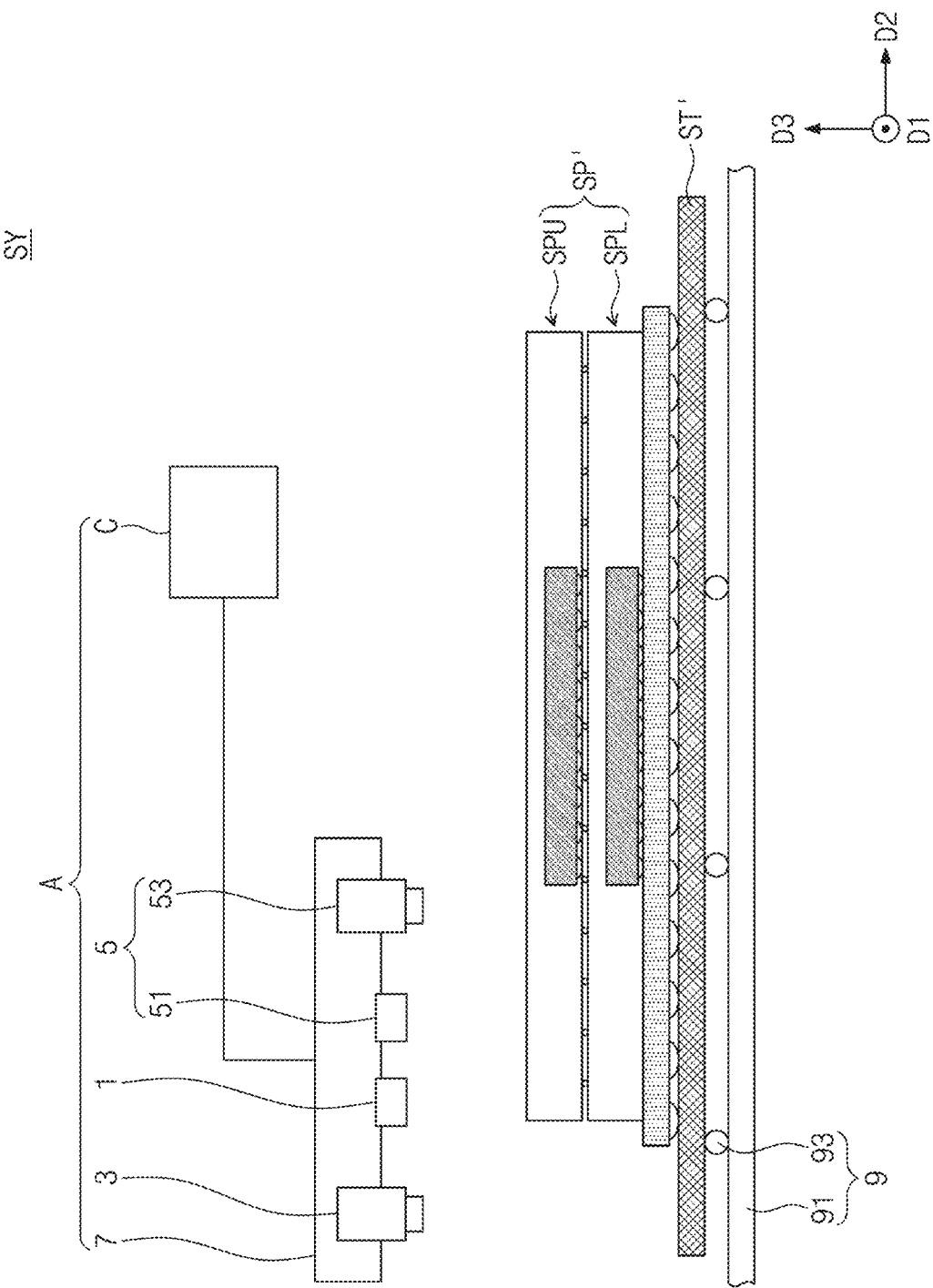
FIG. 14 illustrates a side view showing a semiconductor inspection system according to some example embodiments of inventive concepts.

FIG. 14 illustrates a side view showing a semiconductor inspection system according to some example embodiments of inventive concepts.

For convenience, the following will omit the description substantially the same as or similar to that discussed with reference to FIGS. 1 to 13.

Referring to FIG. 14, a semiconductor package SP' may have a structure in which an upper package SPU is stacked on a lower package SPL. For example, the semiconductor package SP' may be provided in the structure of package-on-package (POP). The semiconductor inspection apparatus A may perform an inspection on a package-on-package type semiconductor package.

According to a semiconductor inspection apparatus, a semiconductor inspection system including the same, and a semiconductor inspection method using the same in accordance with inventive concepts, it may be possible to detect defects such as voids in a molding layer.

According to a semiconductor inspection apparatus, a semiconductor inspection system including the same, and a semiconductor inspection method using the same in accordance with inventive concepts, it may be possible to non-destructively recognize an internal state.

According to a semiconductor inspection apparatus, a semiconductor inspection system including the same, and a semiconductor inspection method using the same in accordance with inventive concepts, a three-dimensional (3D) sensing device may be employed to correct a thickness of the molding layer.

Effects of inventive concepts are not limited to the mentioned above, other effects which have not been mentioned above will be clearly understood to those skilled in the art from the following description.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, et.

Although inventive concepts have been described in connection with the embodiments of inventive concepts illustrated in the accompanying drawings, it will be understood to those skilled in the art that various changes and modifications may be made without departing from the technical spirit and essential feature of inventive concepts. It therefore will be understood that the embodiments described above are just illustrative but not limitative in all aspects. Furthermore example embodiments are not necessarily mutually exclusive. For example, some example embodiments may include one or more features described with reference to one or more figures, and may also include one or more other features described with reference to one or more other figures.

What is claimed is:

1. A semiconductor inspection method, comprising:
   heating a top surface of a semiconductor package to form a heated semiconductor package;
   capturing the top surface of the heated semiconductor package to obtain thermal image data about the top surface of the semiconductor package; and
   analyzing the thermal image data,
   wherein analyzing the thermal image data includes,
   analyzing first thermal image data about the top surface at a first region of the semiconductor package, the first region being provided with a chip, and
   analyzing second thermal image data about the top surface at a second region of the semiconductor package, the second region being provided with no chip, and
   wherein the analyzing the first thermal image data includes,
   obtaining first region data about temperature distribution at the top surface of the first region, and
   obtaining thickness data of a cover molding layer about a thickness distribution of a molding layer on the chip in the first region by using the first region data,
   wherein the analyzing the second thermal image data includes:
   obtaining second region data about a temperature distribution at the top surface of the second region; and
   obtaining thickness data of a peripheral molding layer about a thickness distribution of the molding layer in the second region by using the second region data,
   the method further comprising, obtaining 3D shape data about an outward appearance of the semiconductor package by using a three-dimensional (3D) sensing device; and analyzing the 3D shape data, wherein the analyzing the 3D shape data includes using the 3D shape data to obtain 3D thickness data about the thickness distribution of the molding layer, wherein the analyzing the second thermal image data further includes using the 3D thickness data to correct the thickness data of the peripheral molding layer, and wherein the correcting the thickness data of the peripheral molding layer includes determining the 3D thickness data as a first value when the 3D thickness data is different from the thickness data of the peripheral molding layer obtained by using the second region data.

2. The semiconductor inspection method of claim 1, wherein the heating the top surface of the semiconductor package includes:

irradiating a linear laser beam on the top surface of the semiconductor package, the laser beam extending in a first direction; and driving the semiconductor package to move in a second direction that intersects the first direction while the linear laser beam is irradiated on the semiconductor package.

3. The semiconductor inspection method of claim 1, further comprising:

generating a visual image of the semiconductor package; and displaying the visual image on a display device by using the thickness data of the cover molding layer, the thickness data of the peripheral molding layer, and data of the chip.

4. The semiconductor inspection method of claim 1, wherein the analyzing the second thermal image data further includes:

determining whether one or more of a void, a crack, delamination, or foreign contamination is present on the molding layer by using the second region data.

5. The semiconductor inspection method of claim 1, wherein the obtaining the thickness data is based on a cubic polynomial relation between the thickness data, the first thermal image data, and the second thermal image data.

6. The semiconductor inspection method of claim 1, wherein a relation between the thickness distribution and a change in temperature is such that the change in temperature is greater than 4 Kelvins when a thickness of the cover molding layer is 100 um.

7. A semiconductor inspection method, comprising:

obtaining 3D shape data about an outward appearance of a semiconductor package by using a three-dimensional (3D) sensing device;

heating a top surface of the semiconductor package;

capturing the top surface of the heated semiconductor package to obtain thermal image data about the top surface of the semiconductor package;

analyzing the 3D shape data; and analyzing the thermal image data, wherein analyzing the thermal image data includes, analyzing first thermal image data about the top surface at a first region of the semiconductor package, the first region being provided with a chip; and analyzing second thermal image data about the top surface at a second region of the semiconductor package, the second region being provided with no chip, wherein the analyzing the second thermal image data includes:

obtaining second region data about temperature distribution at the top surface of the second region; and obtaining thickness data of a peripheral molding layer in the second region by using the second region data, wherein the analyzing the 3D shape data includes using the 3D shape data to obtain 3D thickness data in the semiconductor package, and the analyzing the second thermal image data further includes correcting the thickness data of the peripheral molding layer by using the 3D thickness data to, and wherein the correcting the thickness data of the peripheral molding layer includes determining the 3D thickness data as a first value when the 3D thickness data is different from the thickness data of the peripheral molding layer obtained by using the second region data.

8. The semiconductor inspection method of claim 7, wherein the analyzing the first thermal image data includes:

obtaining first region data about a temperature distribution at the top surface of the first region; and obtaining thickness data of a cover molding layer on the chip in the first region by using the first region data.

9. The semiconductor inspection method of claim 7, further comprising:

changing a fabrication process of the semiconductor package based on the thickness data.

10. The semiconductor inspection method of claim 7, wherein the obtaining the thickness data is based on a cubic polynomial relation between the thickness data and the first thermal image data and the second thermal image data.

11. The semiconductor inspection method of claim 7, wherein a relation between a thickness of a cover molding layer and a change in temperature is such that the change in temperature is greater than 4 Kelvins when the thickness of the cover molding layer is 100 um.

* * * * *